United States Patent
Kadir et al.

(10) Patent No.: US 10,453,203 B2
(45) Date of Patent: Oct. 22, 2019

(54) METHOD AND APPARATUS FOR GENERATING IMAGE ALIGNMENT DATA

(71) Applicant: Mirada Medical Limited, Oxford (GB)

(72) Inventors: Timor Kadir, Oxford (GB); Mark Gooding, Oxford (GB); Ian Brown, Warwick (GB)

(73) Assignee: Mirada Medical Limited, Oxford (GB)

( * ) Notice: Subject to any disclaimer, the term of this patent is extended or adjusted under 35 U.S.C. 154(b) by 0 days.

(21) Appl. No.: 14/900,824

(22) PCT Filed: Jun. 10, 2014

(86) PCT No.: PCT/EP2014/062040
§ 371 (c)(1),
(2) Date: Dec. 22, 2015

(87) PCT Pub. No.: WO2014/206722
PCT Pub. Date: Dec. 31, 2014

(65) Prior Publication Data
US 2016/0140716 A1    May 19, 2016

(51) Int. Cl.
*G06K 9/00* (2006.01)
*G06T 7/30* (2017.01)
*G06T 7/33* (2017.01)
*G06T 7/38* (2017.01)

(52) U.S. Cl.
CPC ............. *G06T 7/30* (2017.01); *G06T 7/33* (2017.01); *G06T 7/38* (2017.01); *G06T 2207/10081* (2013.01); *G06T 2207/10088* (2013.01); *G06T 2207/10104* (2013.01); *G06T 2207/20072* (2013.01); *G06T 2207/30004* (2013.01); *G06T 2210/41* (2013.01)

(58) Field of Classification Search
CPC ........... G06T 7/0028; G06T 7/38; G06T 7/30; G06T 7/33; G06T 2210/41; G06T 2207/10081; G06T 2207/10088; G06T 2207/10104; G06T 2207/30004
USPC ......................................... 382/131, 132, 294
See application file for complete search history.

(56) References Cited

U.S. PATENT DOCUMENTS

2010/0046858 A1\* 2/2010 Yun, II ..................... G06T 7/33
382/294

FOREIGN PATENT DOCUMENTS

GB         2 421 652 A      6/2006

OTHER PUBLICATIONS

Jia, Hongjun, et al. "Directed graph based image registration." Computerized Medical Imaging and Graphics 36.2 (2012): 139-151.\*

(Continued)

*Primary Examiner* — Andrew M Moyer
(74) *Attorney, Agent, or Firm* — Optimus Patents US, LLC

(57) ABSTRACT

A method of generating image alignment data for medical images. The method comprises determining prospective image pair registration connections, determining registration weighting values for the determined prospective image pair registration connections based at least partly on intra-image attribute data, determining optimal registration paths for image pairs based at least partly on the registration weighting values for the prospective image pair registration connections, and generating image alignment data for the determined optimal registration paths.

21 Claims, 13 Drawing Sheets

(56) References Cited

OTHER PUBLICATIONS

Jia et al, 'Direct Graph Based Image Registration', Computerized Medical Imaging and Graphics, vol. 36, Issue 2, pp. 139-151, Mar. 2012 available online at: http://www.ncbi.nlm.nih.gov/pmc/articles/PMC3272327/pdf/nihms3327 37.pdf [Accessed Dec. 19, 2013].
Maes et al, 'Multimodality Image Registration by Maximization of Mutual Information', IEEE Trans on Medical Imaging, vol. 16, No. 2, Apr. 1997 available online at:http://ieeexplore.ieee.org/stamp/stamp.jsp?tp=&arnumber=563664 [Accesses Dec. 19, 2013].
Hongjun Jia et al: "Directed graph based image registration", Computerized Medical Imaging and Graphics, vol. 36, No. 2, Mar. 2012 (Mar. 2012), pp. 139-151, XP055137357, ISSN: 0895-6111, DOI: 10.1016/j.compmedimag.2011.09.001 abstract; figures 1,2,6,7 2nd full paragraph; p. 141, col. 1 2nd and 3rd full paragraph; p. 143, col. 2 section 3.2; p. 144.
Crum William R et al: 11 Regi strati on of challenging pre-clinical brain images11 , Journal of Neuroscience Methods, Elsevier Science Publisher B.V., Amsterdam, NL, vol. 216, No. 1, Apr. 2013 (Apr. 2013), pp. 62-77, XP028557520, ISSN: 0165-0270, DOI: 10.1016/J.JNEUMETH.2013.03.015 abstract; figures 2-4,13,15 1st full para.; p. 64, col. 1 section 2. 1. 1; p. 64.
Carolej Twining et al: A Unified Information—Theoretic Approach to Groupwise Non-rigid Registration and Model Building Jul. 10, 2005 (Jul. 10, 2005), Information Processing in Medical Imaging; [Lecture Notes in Computer Science;;LNCS], Springer-Verlag, Berlin/Heidelberg, pp. 1-14, XP019011579, ISBN: 978-3-540-26545-0 cited in the application abstract; figures 1,2 pp. 3-5.
Qian Wang et al: Groupwise registration based on hierarchical image clustering and atlas synthesis11, Human Brain Mapping, Jan. 2009 (Jan. 2009), pp. 1128-1140, XP055138376, ISSN: 1065-9471, DOI: 10.1002/nbm.20923 abstract; figures 1-3 p. 1130, col. I, paragraphs 1,2.

\* cited by examiner

METHOD AND APPARATUS FOR GENERATING IMAGE ALIGNMENT DATA

FIELD OF THE INVENTION

This invention relates to a method and apparatus for generating image alignment data, and more particularly to a method and apparatus for generating image alignment data for medical images.

BACKGROUND OF THE INVENTION

In the field of medical image computing, image registration is the process of generating image alignment data in order to enable the correct alignment of medical images. In particular, image registration is the process of transforming sets of data into one coordinate system. Such image data may comprise photographs, data from different sensors, from different viewpoints and/or at different times. Medical image computing typically operates on uniformly sampled data with regular x-y-z spatial spacing (images in 2D and volumes in 3-D, generically referred to as images). Image registration is necessary in order to be able to compare or integrate the different sets of data.

Medical images obtained through a variety of modalities, such as CT (computed tomography), PET (positron emission tomography), and MRI (magnetic resonance imaging), are commonly acquired in groups with little patient motion between acquisitions. For example, MRI images are often acquired using multiple pulse sequences to generate different image appearance, gated image sequences where images acquired for different points of, say, the breathing or cardiac cycle, dynamic sequences where the uptake of an image contrast agent is observed using multiple images, etc.

Images may require alignment with each other for a variety of reasons, for example with the use of multiple imaging modalities for radiotherapy contouring or assessment of follow-up images taken over a number of years. Images obtained using different modalities or at different times may have substantial differences between patient position, or other differences such as changes in anatomy due to growth etc. For example, a pair of PET/CT images, which are in the same frame of reference because they were acquired on a hybrid scanner, may require alignment to a series of MRI images of different pulse sequences. The MRI images would typically comprise a different frame of reference to the PET/CT images, but would be approximately aligned to each other as a group acquired at a similar time.

Rigid, affine and deformable image registration methods may be used to correct for differences within images to be aligned to different extents. In rigid alignment, translation and rotation of the images may be performed. In affine alignment, shearing and scaling of the images may be performed in addition to translation and rotation. In deformable alignment, translation of individual points within an image is able to be performed.

Various methods for aligning a pair of images are known, such as "Medical image registration"; D Hill, P Batchelor, M Holden and D Hawkes. Phys Med Biol 2001;46:R1-R45, and "A viscous fluid model for multimodal non-rigid image registration using mutual information"; E D'Agostino, F. Maes, D. Vandermaeulen and P. Suetens. Medical Image Analysis 2003; 7(4):565-575.

The simplest application is to register a single image to another single image. However, in a clinical situation, there may be numerous images for a patient that a clinician would like to be registered with one another. Such images may be obtained via different 'acquisitions', each acquisition potentially comprising multiple individual images. The different acquisitions may relate to different imaging modalities used to obtain the respective images, different acquisition times for the respective images, etc.

One approach is to simply register every image with every other image. However, this approach can be prohibitively time consuming when there are a relatively large number of images to be so registered. In addition, such direct registration may also lead to poor registrations in some instances where there is weak information content in some of the images. Inconsistencies between registrations may also arise whereby, for example, despite all images in an acquisition being approximately the same, the registrations back to an image in a different acquisition end up being substantially different.

Another known approach is to register images within a group to a common frame of reference. In this approach all images are registered to either a single image or to an average image constructed from all the images in the group. This is known as group-wise registration whereby registration between any pair of images can be calculated by performing the forward transformation to the reference space, followed by the inverse transformation to the target image. Group-wise registration is discussed in greater detail in "A unified information-theoretic approach to groupwise non-rigid registration and model building"; C. Twinning, T Cootes, S Marsland, V. Petrovic, R. Schestowitz and C. Taylor. Lecture Notes in Computer Science 2005;3565:167-198.

However, group-wise registration suffers from the drawback that the registrations performed may be unsuitable, and that the information content between the images may be weak, leading to numerically unstable registration. For example, the information content, i.e. the strength of features used for registration, of a PET image from one acquisition may be low, so registration of this via a reference image, for example a CT image of a different acquisition to a CT image of the same acquisition as the PET image may be less suitable than direct registration.

Thus, there is a need for a computationally efficient method and apparatus for performing reliable registration of medical images.

SUMMARY OF THE INVENTION

Accordingly, the invention seeks to mitigate, alleviate or eliminate one or more of the abovementioned disadvantages singly or in any combination.

According to a first aspect of the present invention, there is provided a method of generating image alignment data for medical images. The method comprises determining prospective image pair registration connections, determining registration weighting values for the determined prospective image pair registration connections based at least partly on intra-image attribute data, determining optimal registration paths for image pairs based at least partly on the registration weighting values for the prospective image pair registration connections, and generating image alignment data for the determined optimal registration paths.

In this manner, and as described in greater detail below, by determining optimal registration paths for image pairs based on such registration weighting values for prospective image pair registration connections, reliable image alignment data may be generated (and thus reliable image registration performed) in a computationally efficient manner for image pairs within a series of medical images. In particular, reliable image alignment data may be generated without performing computationally intensive one-to-one registration between all medical image pairs in the series of medical images, or otherwise requiring inter-image data such as mutual-data to be derived.

In some examples of the present invention, intra-image attribute data may comprise at least one of meta-data, surrogate-data, and differential-data.

In some examples of the present invention, determining prospective image pair registration connections may comprise arranging images into groups, determining at least one group representative image for each group of images, and defining prospective inter-group image pair registration connections via the determined group representative images.

In some examples of the present invention, the method may comprise arranging images into groups based at least partly on at least one known spatially related parameter.

In some examples of the present invention, the method may comprise arranging images into groups based at least partly on at least one of image acquisitions and frames of reference.

In some examples of the present invention, the method may further comprise arranging images within at least one group into subgroups, determining at least one subgroup representative image for each subgroup of images, and defining prospective inter-subgroup image pair registration connections via the determined subgroup representative images.

In some examples of the present invention, the method may comprise arranging images within the at least one group into subgroups based at least partly on at least one of:
  a heuristic;
  assessing one or more pieces of meta-data, surrogate-data and/or differential-data using statistical or logical techniques; and
  assessing mutual-data for significant differences between the images.

In some examples of the present invention, the method may comprise defining prospective intra-subgroup image pair registration connections between every pair of images within a respective subgroup such that each image within a subgroup comprises a prospective intra-subgroup image pair registration connection with every other image within that subgroup.

In some examples of the present invention, the method may comprise determining a group representative image for at least one group of images from the representative images for the subgroups of images within that group.

In some examples of the present invention, the method may comprise identifying subgroups to be treated as separate groups in their own right, and separating out the identified subgroups into separate groups.

In some examples of the present invention, the method may comprise identifying subgroups to be treated as separate groups in their own right based at least partly on at least one of:
  a heuristic;
  assessing one or more pieces of meta-data, surrogate-data and/or differential-data using statistical or logical techniques;
  assessing mutual-data for significant differences between the images;
  estimating a required registration between subgroup representative images within a group; and
  estimating a require registration between subgroup representative images and a representative image of the respective group.

In some examples of the present invention, the method may comprise determining representative images based at least partly on image characteristics comprising at least one of:
  meta-data;
  surrogate-data;
  differential data; and
  a heuristic.

In some examples of the present invention, the method may comprise determining registration weighting values for the prospective image pair registration connections based at least partly on at least one of:
  known actual spatial relationships between image pairs;
  estimated spatial relationships between image pairs;
  identity relationships between image pairs;
  differences between image attributes using differential-data;
  values learnt from training data.

In some examples of the present invention, the method may comprises assigning the determined registration weighting values for the prospective image pair registration connections to a weighted graph representing the prospective image pair registration connections, and determining optimal registration paths for image pairs based at least partly on the weighted graph representing the prospective image pair registration connections.

In some examples of the present invention, the method may comprise generating registration transformations for image pair registration connections within the determined optimal registration paths.

In some examples of the present invention, the method may comprise generating image alignment data for a determined optimal registration path by concatenating registration transformations for image pair registration connections within that determined optimal registration path.

In some examples of the present invention, the method may further comprise providing the generated image alignment data to at least one image display component to enable the at least one image display component to align images for display.

According to a second aspect of the present invention, there is provided a method of displaying a plurality of medical images. The method comprises generating image alignment data for at least a set of medical images to be displayed in accordance with the first aspect of the present invention, aligning at least the set of medical images to be displayed based at least partly on the image alignment data therefor, and displaying the aligned set of medical images.

According to a third aspect of the present invention, there is provided a medical imaging system comprising at least one image registration component for generating image alignment data for medical images. The at least one image registration component being arranged to determine prospective image pair registration connections, determine registration weighting values for the determined prospective image pair registration connections based at least partly on intra-image attribute data, determine optimal registration paths for image pairs based at least partly on the registration weighting values for the prospective image pair registration connections, and generate image alignment data for the determined optimal registration paths.

According to a fourth aspect of the present invention, there is provided a non-transitory computer program product having executable program code stored therein for generating image alignment data for medical images. The program code is operable for determining prospective image pair registration connections, determining registration weighting values for the determined prospective image pair registration connections based at least partly on intra-image attribute data, determining optimal registration paths for image pairs based at least partly on the registration weighting values for the prospective image pair registration connections, and generating image alignment data for the determined optimal registration paths.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
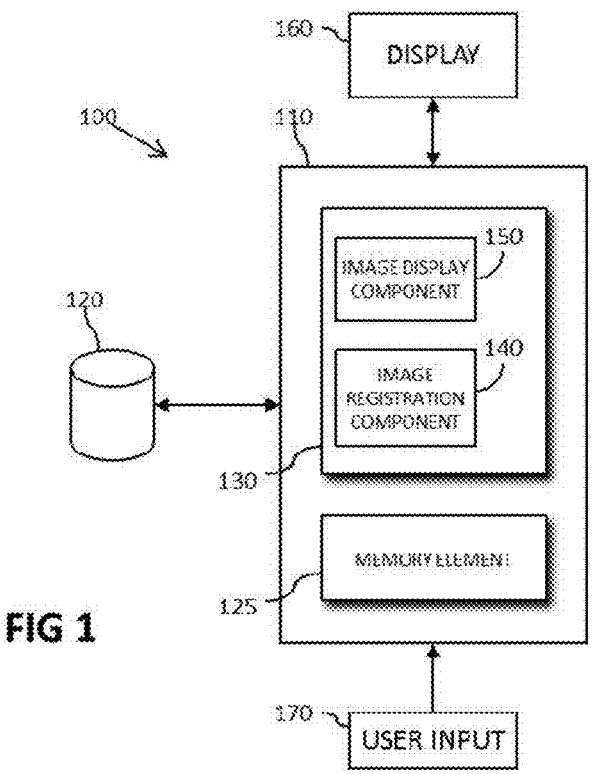
FIG. 1 illustrates a simplified block diagram of an example of a medical imaging system.

An example of the present invention will now be described with reference to the accompanying drawings. However, it will be appreciated that the present invention is not limited to the specific embodiment(s) herein described and illustrated in the accompanying drawings. For example, an example of an image registration component according to one aspect of the present invention arranged to be executed on a signal processing module within a user terminal is herein described with reference to the accompanying drawings. However, it is contemplated that the present invention is not limited to such an image registration component executing within a user terminal, and it will be appreciated that such an image registration component may equally be implemented within, say, a backend server or other similar signal processing device.

Furthermore, because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

The term 'meta-data' is used herein to refer to attributes related to an image, but not directly calculated from the image. Examples of such meta-data may comprise, for example:
Size of the image (number of voxels);
Dimensions of the image (number of voxels in each direction);
Resolution;
Field of view (size in real world dimensions);
Image acquisition details, such as modality or pulse sequence; and
Acquisition date/time;

The term 'surrogate-data' is used herein to refer to attributes related to an image, calculated from the image content. Examples of such surrogate-data may comprise, for example:
Contrast/dynamic range; and
Information content (this may be measured in a number of ways, for example image entropy).

The term 'differential-data' is used herein to refer to attributes comparing a pair of images, but not directly calculated from the images together. Examples of such differential-data may comprise, for example:
Difference in field of view between the images;
Other differences in meta-data between the images;
Difference in dynamic range of the images; and
Other differences in surrogate-data between the images.

The term 'mutual-data' is used herein to refer to attributes related to a pair of images, calculated directly from the image content based on an alignment. Examples of such mutual-data may comprise, for example:
Cross-correlation;
Correlation ratio;
Mutual information;
Sum squared difference;
Ratio image uniformity; and
Normalised variants of those above.

In accordance with the above definitions, meta-data and surrogate-data comprise attributes that relate to a single image. As such, meta-data and surrogate-data may be considered as "intra-image data". Significantly, such intra-image data may be pre-computed on an individual image basis. As defined above, differential-data is used to refer to attributes comparing a pair of images (but not directly calculated from the images together). As such, differential-data may be considered as referring to attributes comparing intra-image data. In contrast, mutual data comprises attributes that related to a pair of images, calculated directly from the image content based on an alignment. As such, mutual data may be considered as "inter-image data".

Referring now to FIG. 1, there is illustrated a simplified block diagram of an example of a medical imaging system 100 arranged to enable medical images to be displayed to a user. In the illustrated example, the medical imaging system 100 comprises one or more user terminals 110, for example comprising a workstation or the like, arranged to access medical images stored within, for example, a database 120 or other data storage apparatus. In the illustrated example, a single database 120 is illustrated. However, it will be appreciated that the user terminal 110 may be arranged to access medical images from more than one data storage apparatus. Furthermore, in the illustrated example the database 120 is illustrated as being external to the user terminal 110. However, it will be appreciated that the user terminal 110 may equally be arranged to access medical images stored locally within one or more internal memory elements, such as the memory element illustrated generally at 125. The user terminal 110 further comprises one or more signal processing modules, such as the signal processing module illustrated generally at 130. The signal processing module(s) is/are arranged to executing computer program code, for example stored within the memory element 125. In the illustrated example, the signal processing module(s) 125 is/are arranged to execute computer program code comprising one or more image registration component(s) 140, the image registration component(s) 140 being arranged to generate image alignment data for medical images. The signal processing module 125 in the illustrated example is further arranged to execute computer program code comprising one or more image display component(s) 150, the image display component(s) 150 being arranged to align medical images to be displayed based at least partly on image alignment data, such as image alignment data generated by the image registration component(s) 140, and to display the aligned set of medical images to a user, for example on a display screen 160 or the like. The medical imaging system 100 may further comprise one or more user input devices, such as illustrated generally at 170, to enable a user to interact with computer program code etc. executing on the signal processing module(s) 125.

Figure 2:
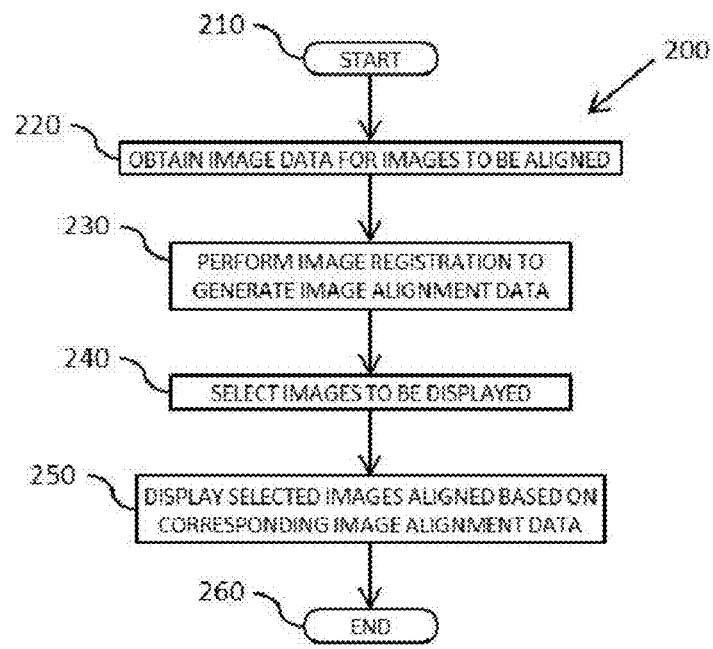
FIG. 2 illustrates a simplified flowchart of an example of a method of displaying a plurality of medical images.

FIG. 2 illustrates a simplified flowchart 200 of an example of a method of displaying a plurality of medical images, such as may be performed by the medical imaging system 100 of FIG. 1. The method starts at 210, and moves on to 220 where image data for a series of medical images to be aligned is obtained, for example from the database 120 in FIG. 1. Such image data may have been generated through a variety of modalities, such as CT (computed tomography), PET (positron emission tomography), and MRI (magnetic resonance imaging), etc. and may comprise photographs, data from different sensors, from different viewpoints and/or at different times. Medical image computing typically operates on uniformly sampled data with regular x-y-z spatial spacing (images in 2D and volumes in 3-D, generically referred to as images). Next, at 230, image registration is performed on the obtained image data to generate image alignment data for the series of medical images. In the example illustrated in FIG. 1, such image registration may be performed by the image registration component(s) 140. The image registration component(s) 140 may store the generated image alignment data within the external database 120 or within the internal memory element 125. Additionally/alternatively, the image registration component(s) 140 may pass the generated image alignment data to one or more other component(s) within the medical imaging system 100, such as the image display component(s) 150. Referring back to FIG. 2, having performed the image registration for the image data, the method moves on to 240 where images to be displayed are selected, for example from the series of images for which image registration was performed. Next, at 250, the selected images (or parts thereof) are aligned based on image alignment data therefor, for example by the image display component(s) 150 in the example illustrated in FIG. 1, which may retrieve the selected images (and image alignment data if not received directly from the image registration component 140) from, say, the database 120. The aligned images (or parts thereof) are then displayed, at 260, for example by way of display screen 160. The method then ends, at 270.

As identified in the background of the invention, there is a need for a computationally efficient method and apparatus for performing reliable registration of medical images. In accordance with some example embodiments of one aspect of the present invention, there is provided a method of generating image alignment data for medical images. The method comprises determining prospective image pair registration connections, determining registration weighting values for the determined prospective image pair registration connections based at least partly on intra-image attribute data, determining optimal registration paths for image pairs based at least partly on the registration weighting values for the prospective image pair registration connections, and generating image alignment data for the determined optimal registration paths.

In this manner, and as described in greater detail below, by determining optimal registration paths for image pairs based on such registration weighting values for prospective image pair registration connections, reliable image alignment data may be generated (and thus reliable image registration performed) in a computationally efficient manner for image pairs within a series of medical images. In particular, reliable image alignment data may be generated without performing computationally intensive one-to-one registration between all medical image pairs in the series of medical images, or otherwise requiring inter-image data such as mutual-data to be derived.

For example, determining prospective image pair registration connections may comprise arranging images into groups. The images may be grouped based on, for example, known spatial similarities such as same or related image acquisitions, respective frames of reference, etc. By arranging images into such groups, existing relationships between images may be taken advantage when determining prospective image pair registration connections, thereby enabling the complexity of determining optimal registration paths for image pairs to be reduced.

For example, images obtained during the same acquisition (i.e. by the same sensor during a single imaging session), where it may be assumed that there is limited (if any) movement of the subject relative to the equipment generating the image data, may be grouped together. Additionally, there may be cases where images obtained in separate acquisitions may be grouped together, for instance if a spatial correspondence between the acquisitions is known. Such a scenario might arise when, for example, images are generated by way of multi-modal imaging equipment, such as GE Healthcare's PET/CT+MR Trimodality imaging system. In this case, images may be obtained through different acquisitions (i.e. different modalities), but the spatial difference may be known and constant, and thus the image transformations required for registration between the two acquisitions may also be known and constant. Such grouping of images may be performed manually and/or automated.

Figure 3:
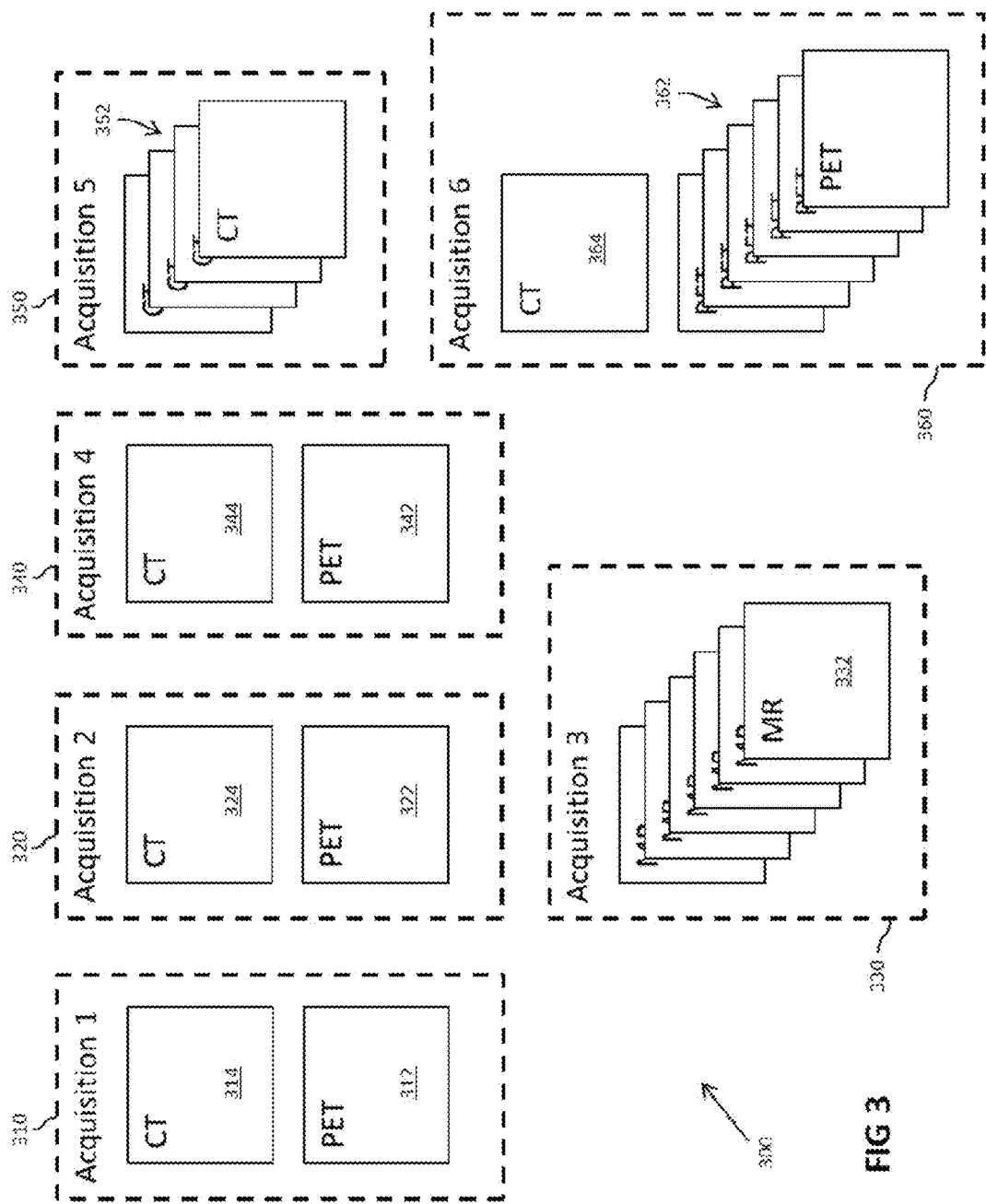
FIGS 3 to 11 illustrate a simplified example of stages within a method of generating image alignment data.

FIG. 3 illustrates a simplified example of a series of images 300 obtained through a plurality of acquisitions, with the images being arranged into groups (six in the illustrated example). In this illustrated example, the series of images have been grouped in based at least partly on their acquisitions (grouped images indicated by dashed boxes). Acquisition group 1 310 includes a PET image 312 and a CT image 314 acquired on a hybrid scanner. Acquisition group 2 320 includes a PET image 322 and a CT image 324 also acquired on a hybrid scanner, but taken at a different point in time to the images of Acquisition group 1 310, for example one year later. Acquisition group 3 330 includes a sequence of six MR (magnetic resonance) images 332 acquired in a single session, for example one week after Acquisition 2 320. Acquisition group 4 340 includes a PET image 342 and a CT image 344 acquired on a hybrid scanner taken, for example, one year after Acquisition group 2 320. Acquisition group 5 350 includes a sequence of gated CT images 352 taken, for example, one week after Acquisition group 4 340. Acquisition group 6 360 includes a dynamic set of PET images 362 with a CT image 364 acquired on a hybrid scanner taken, for example, one week after Acquisition group 5 350.

In some examples of the present invention, it is further contemplated that the grouped images may be further arranged into subgroups, for example so as to further minimise inter-subgroup registration error between images. For example, grouped images may be further arranged into subgroups based on a heuristic, for example that has been pre-determined by a manufacturer, configured by an administrator or specified by a user. Such a heuristic may be defined based on one or more pieces of meta-data, surrogate-data and/or differential-data; such data being used as a way of indirectly estimating the difficulty in performing accurate registration between image pairs.

Additionally/alternatively, grouped images may be further arranged into subgroups based on assessing one or more pieces of meta-data, surrogate-data and/or differential-data using statistical or logical techniques. Such techniques may automatically determine subgroups which minimise the variation of the data within subgroups, whilst maximising the variation between subgroups for the data.

Additionally/alternatively, grouped images may be further arranged into subgroups based on assessing mutual-data for significant differences between the images. Where images within a group are acquired on the same machine, in the same session and therefore in the same frame-of-reference, the mutual-data between images may be calculated in that frame of reference. Otherwise, images in the same group may be centre-aligned prior to calculation of mutual-data.

The term 'frame-of-reference' is conventionally applied in a specific manner within the Digital Imaging and Communications in Medicine (DICOM) standard as a way to link images that are acquired in the same session on a single scanner, or that in some other way exist in the same space, such that the appropriate registration between them is the 'identity relationship'. The use of the term herein should be interpreted accordingly.

In some examples, grouped images may be manually arranged into subgroups by a user.

Figure 4:
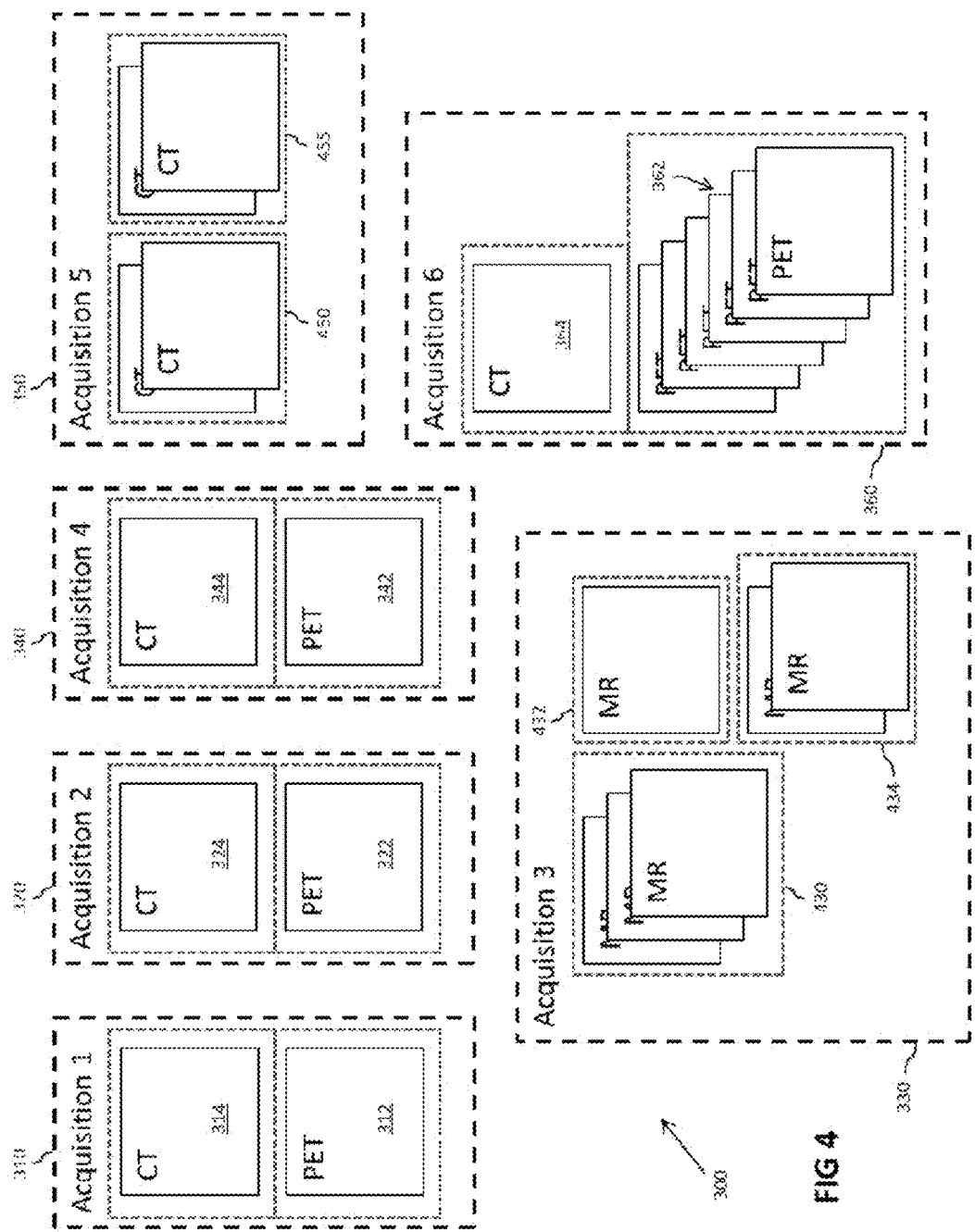

FIG. 4 illustrates a simplified example of the series of images 300 of FIG. 3 being further arranged into subgroups. In the example illustrated in FIG. 4, the CT images of acquisition group 5 350 have been separated into two sub-groups 450, 455, for example manually by a user. The PET images and CT images of acquisition groups 1 310, 2 320, 4 340 and 6 360 have been separated into sub-groups heuristically in an automated manner by the image registration component 140 using, say, the modality difference. The MR images of acquisition group 3 330 have been separated into three groups by the image registration component 140. The first subgroup 430 may have been identified as being distinct from the others by resolution. The second subgroup 432 may have been identified as being distinct from the others by the information content. The third subgroup 434 may be distinct from the others based on both measures.

In some example embodiments, having arranged the images in to groups (and subgroups), (sub)group representative images may be determined, for example one for each (sub)group of images. Prospective image pair registration connections between (sub)groups may then be defined in relation to the determined (sub)group representative images.

For example, a representative image for a (sub)group may be determined automatically or manually selected by a user based on one or more pieces of meta-data and/or surrogate-data, whereby a 'best' (or most appropriate) image from the (sub)group of images is identified for use as a representative image for that (sub)group for the purpose of inter-(sub) group registration. Where representative images are determined automatically, a heuristic may be used defined using, say, one or more pieces of meta-data and/or surrogate-data. Such a heuristic may be pre-determined by the manufacturer, configured by an administrator or specified by a user.

There are many attributes that may be of interest for determining a representative image for a (sub)group of images, depending on the nature of the imaging. The attribute may also vary with modality, for example field-of-view may be more important for CT images, whereas imaging sequence may be more important for MR images. For example, a 'best' image may be selected based on image characteristics such as one or more of:

- meta-data, such as field-of-view where the image with the largest field of view may be desirable as the representative image such that the registration image covers the whole (the largest proportion of) field-of-view of all the (sub)group's images, or resolution where the image with the highest resolution image may be desirable as the representative image to ensure an accurate registration;
- surrogate-data such as signal-to-noise ratio where the image which is "cleanest" may be desirable as the representative image to enable an accurate inter-group registration;
- differential data; and/or;
- a heuristic.

Figure 5:
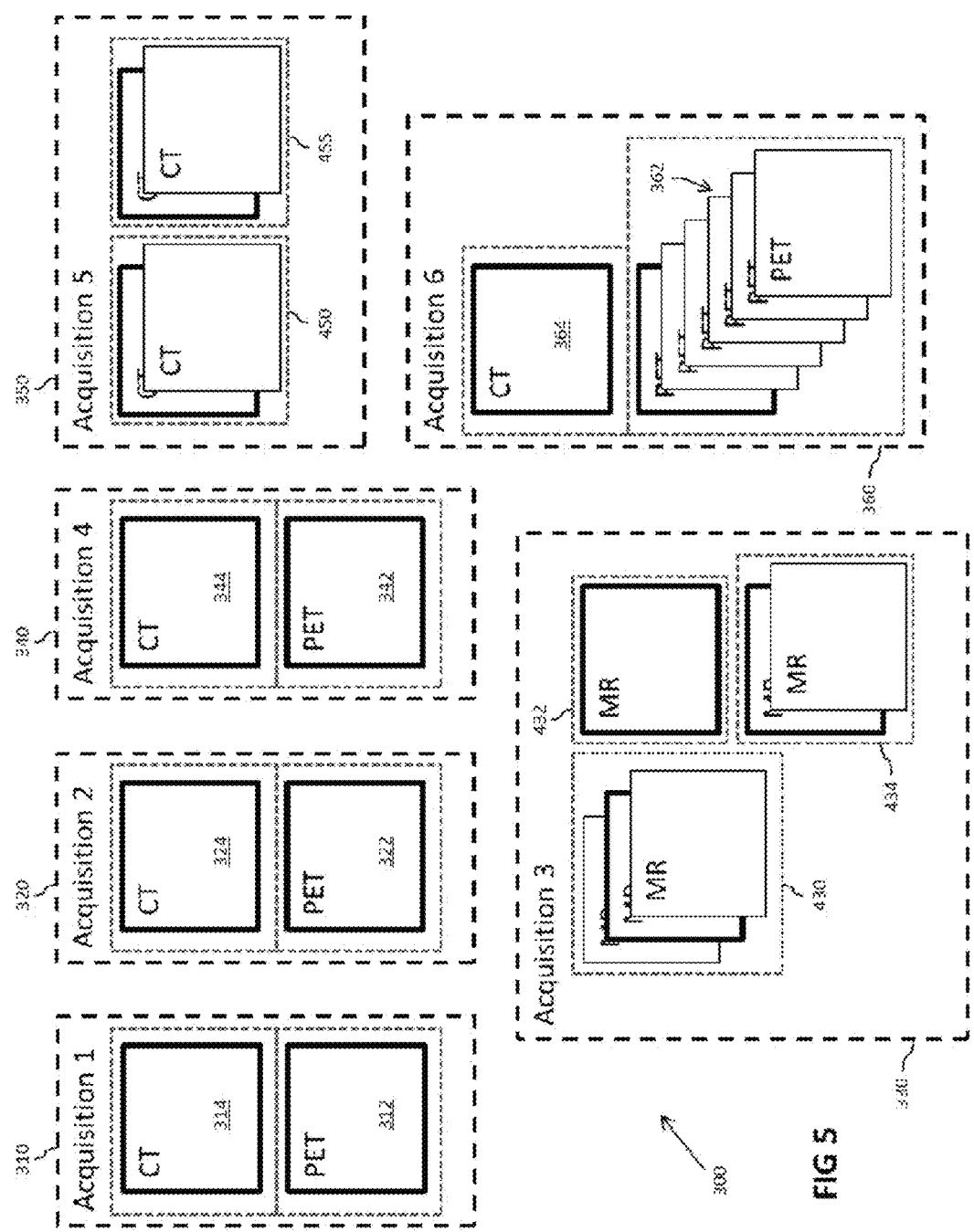

FIG. 5 illustrates a simplified example of the selection of representative images (illustrated by bold lines) for each of the subgroups. The subgroups containing individual images in acquisition groups 1 310, 2 320, 3 330, 4 340 and 6 360 are automatically deemed to be their respective subgroup representative images. The first CT image with the sequence of gated CT images of each of the sub-groups 450, 455 in acquisition group 5 350 and the first PET image within the dynamic set of PET images 362 in acquisition group 6 360 are heuristically determined by time of acquisition to be the representative images of their respective sub-groups. The second MR image of the first subgroup 430 of acquisition group 3 330 is selected as the representative image for that subgroup due to its information content (e.g. field-of-view). The first MR image of the third subgroup 434 of acquisition group 3 330 is selected as the representative image due to its resolution.

Having selected subgroup representative images, prospective intra-subgroup image pair registration connections may be determined, and registration weighting values therefor determined. For example, prospective intra-subgroup image pair registration connections may be defined between every pair of images within the respective subgroup, such that each image within the subgroup comprises a prospective intra-subgroup image pair registration connection with every other image within the subgroup. Registration weighting values may then be determined for each prospective intra-subgroup image pair registration connection.

Registration weighting values may relate to the expected accuracy, or usefulness, of registration between a pair of images. As such, images that are very different may not register accurately (because they are too dissimilar) or in a useful way (for instance if the fields-of-view of the images mean that they do not overlap very much). Registration weighting values may be determined by estimating spatial relationships between image pairs using intra-image data (e.g. meta-data, and/or surrogate-data), without actually performing registration calculations, or otherwise requiring inter-image data such as mutual-data to be derived. For example, registration weighting values may be determined based at least partly on known spatial relationships, such as Identify relationships, e.g. whether the images are found or deemed to be in the same spatial frame. For clarity, the Identity relationship is essentially a rigid registration with no rotation or translation. So a point in one image would map to the same spatial location in the second image without any change. Where an Identity relationship can be safely assumed, the registration weighting value may be negligible since there is no computation to perform and therefore no chance of inaccurate registration. Additionally/alternatively, registration weighting values may be assigned on the basis of the differences between images using, for example, differential-data. In some examples, it is further contemplated that registration weighting values may be learnt from training data or the like.

Figure 6:
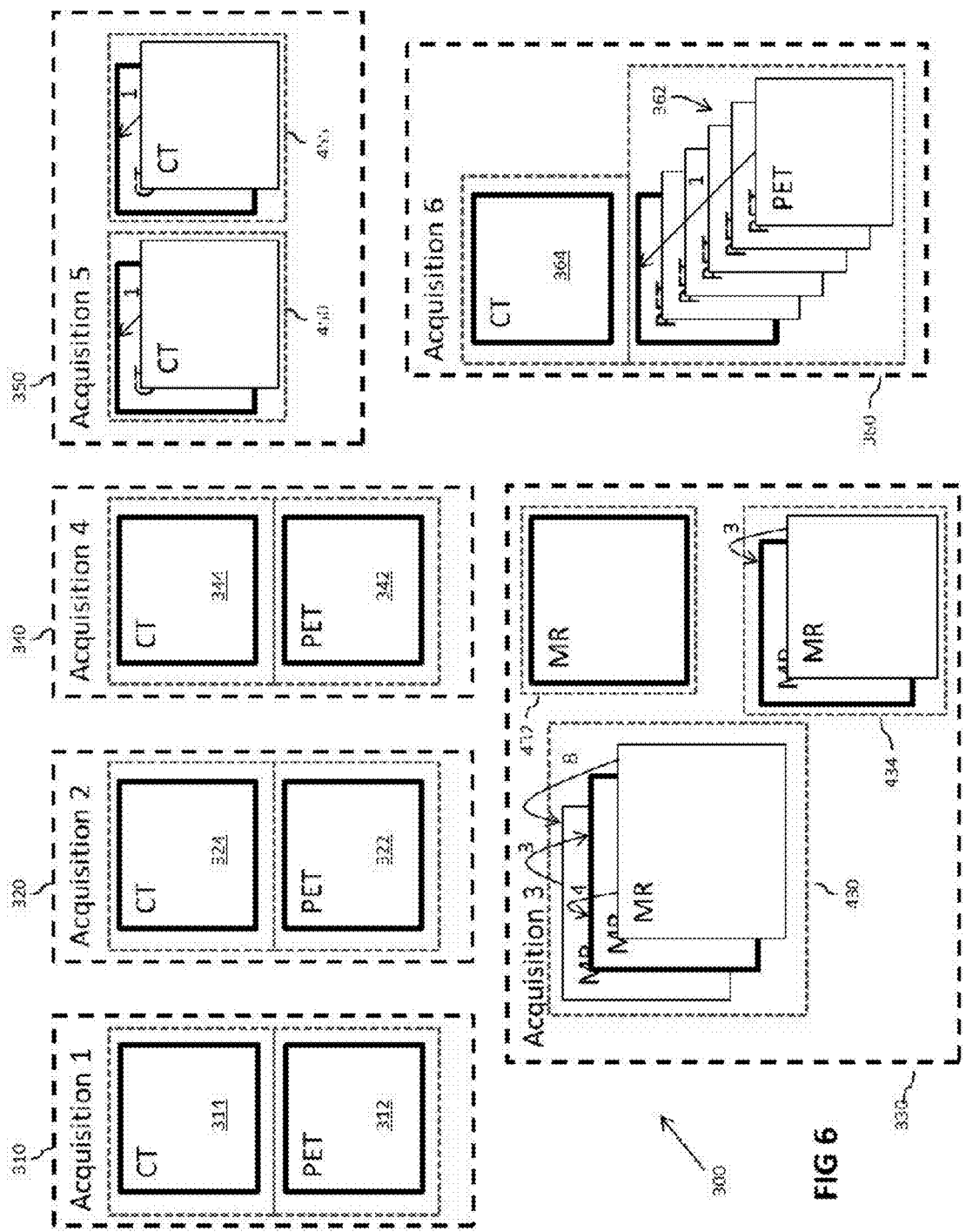

FIG. 6 illustrates a simplified example of the intra-subgroup registration weighting values for the series of images 300 of FIG. 3. Deformable registrations, illustrated by way of curved lines, may be estimated automatically for the subgroups 430, 434 in acquisition 3, and registration weighting values assigned based on the estimated total deformation required. Registration weighting values for gated and dynamic sequences from acquisition groups 5 & 6 have been assigned low registration weighting values (indicated by values of 1), on the basis of a heuristic for such image sequences being the same frame-of-reference, represented by straight lines in FIG. 6.

In accordance with some example embodiments of the present invention, it is contemplated that some subgroups may be better treated as separate groups in their own right, and may be separated out into separate groups. Subgroups to be treated as separate groups may be identified in a similar manner to that used in defining subgroups, for example based on individual images within subgroups or on the subgroup representative images. For example, the separation of subgroups into separate groups may occur because the images in each new group are sufficiently different to merit performing separate registration between the subgroups. It may be determined that a particular subgroup is so very different that it would be better to treat it as an individual group. For example, there may be variation in the field-of-view of images within a group, so images with a common field of view would be combined into subgroups. Of these subgroups some may overlap, and thus be regarded as subgroups within the same group. However, another subgroup may have no overlap of field-of-view with the others and thus be better regarded as a new group. Additionally/alternatively, identifying subgroups to be treated as separate groups in their own right may comprise estimating the required registration between the subgroup representative images within a group, and the subgroups requiring substantial deformation between their representative images and those of other subgroups within the group may be treated as entirely new groups. Additionally, alternatively, identifying subgroups to be treated as separate groups in their own right may comprise estimating the require registration between the subgroup representative image and a representative image of the respective group, and the subgroups requiring substantial deformation between their representative images and the group representative image may be treated as entirely new groups.

Figure 7:
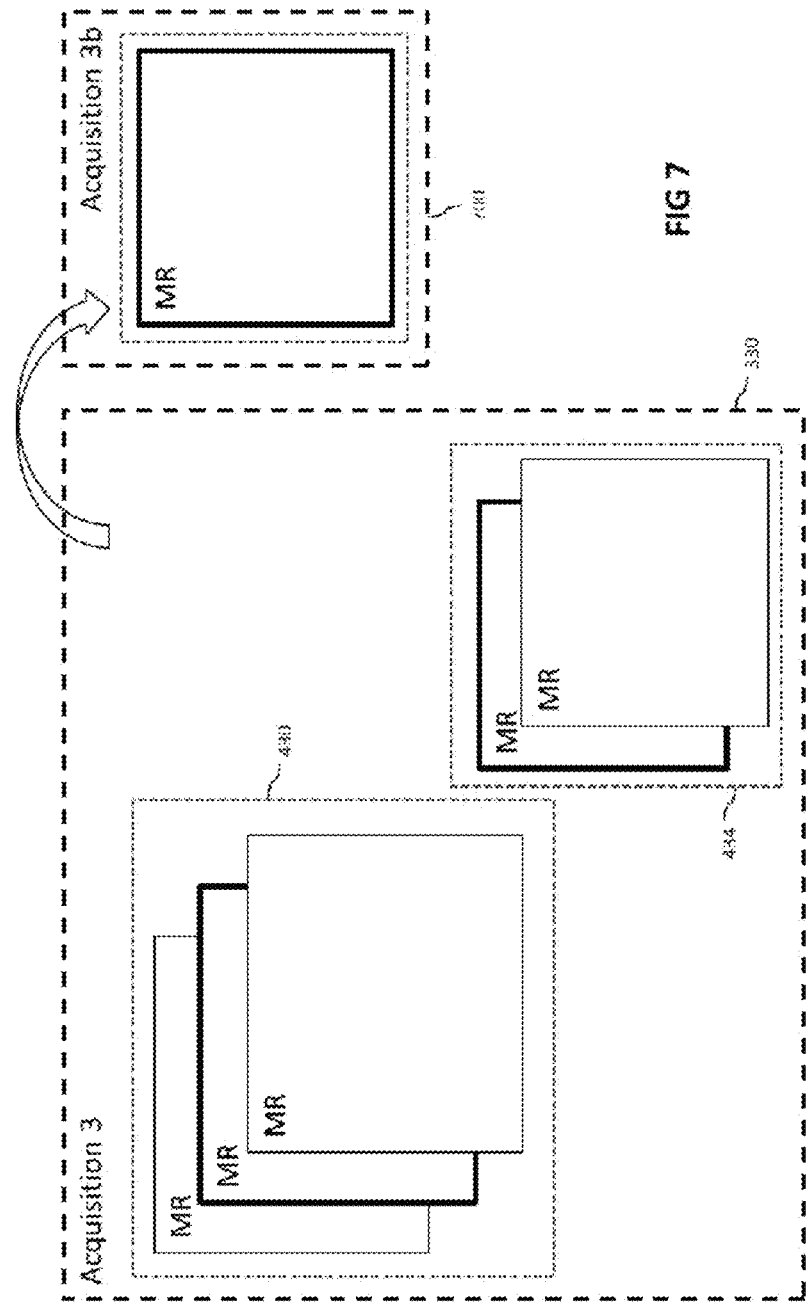

FIG. 7 illustrates a simplified example of the separating out of a subgroup into a separate group. In the illustrated example, the single MR image making up the second subgroup 432 is identified as having a representative image which is too dissimilar to the other subgroups' representative images. As such, the single MR image making up the second subgroup 432 is separated out of acquisition group 3 330 into a separate group 700 (acquisition group 3b).

In addition to determining representative images for each subgroup (subgroup representative images), representative images may be determined for each group (group representative images). For example, a representative image for a group may be determined in a similar manner to determining representative images for each subgroup. As such, a representative image for a group may be determined automatically or manually selected by a user based on one or more pieces of meta-data and/or surrogate-data, whereby a 'best' (or most appropriate) image from the (sub)group of images is identified for use as a representative image for that (sub)group for the purpose of inter-(sub)group registration. Where representative images are determined automatically, a heuristic may be used defined using, say, one or more pieces of meta-data and/or surrogate-data. Such a heuristic may be pre-determined by the manufacturer, configured by an administrator or specified by a user.

The same attributes as for determining subgroup representative images may be of interest for determining a representative image for a group of images, depending on the nature of the imaging. The attribute may also vary with modality, for example field-of-view may be more important for CT images, whereas imaging sequence may be more important for MR images. For example, a 'best' image may be selected based on image characteristics such as one or more of:

field-of-view, where the image with the largest field of view may be desirable as the representative image, such that the registration image covers the whole (the largest proportion of) field-of-view of all the (sub) group's images;

signal-to-noise ratio, where the image which is "cleanest" may be desirable as the representative image, to enable an accurate inter-group registration;

resolution, where the image with the highest resolution image may be desirable as the representative image, to ensure an accurate registration and/or;

any other meta- and/or surrogate-data.

In some examples, a group representative image for a group of images may be selected from the representative images for the subgroups of images within that group.

Figure 8:
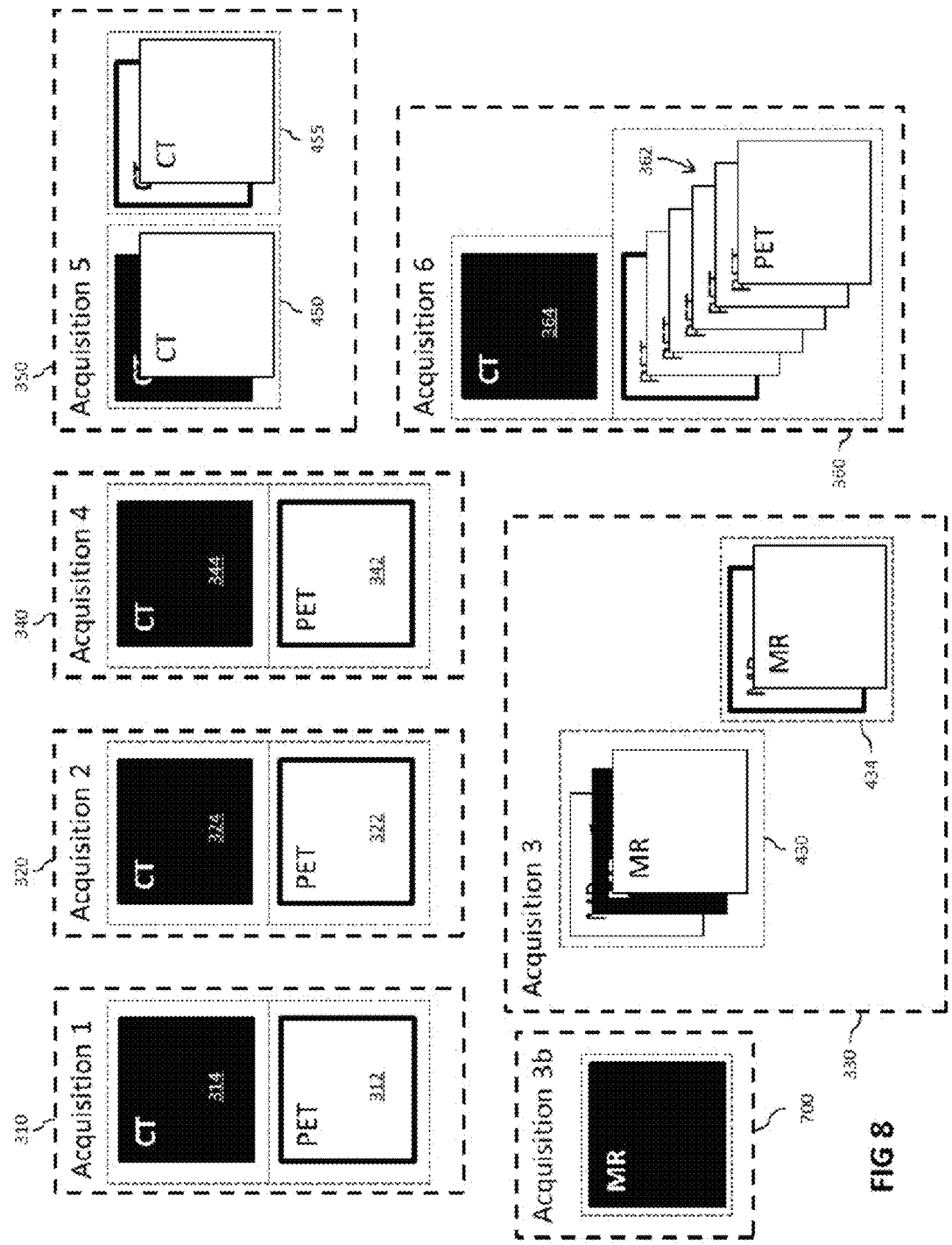

FIG. 8 illustrates a simplified example of the selection of representative images for each of the groups. In this illustrated example, the group representative images (illustrated as black boxes with white text) are selected from the subgroup representative images for the subgroups within the respective groups. For example, the CT images of acquisition groups 1 310, 2 320, 4 340 and 6 360 are heuristically selected to be the group representative images due to them being obtained using an anatomical modality. The first CT image of the dynamic sequence of acquisition group 5 350 is heuristically selected to be the group representative image due to it being the first to be acquired. The second MR image of the first subgroup 430 of acquisition group 3 330 is selected to be the group's representative image due to it having the highest mutual information with a CT image from another group having the closest acquisition time.

Having arranged the images into subgroups and selected the subgroup representative images, prospective inter-subgroup image pair registration connections may also be determined, and registration weighting values therefor determined. For example, prospective inter-subgroup image pair registration connections may be defined between every pair of subgroup representative images within the respective group, such that each subgroup representative image within the group comprises a prospective inter-subgroup image pair registration connection with every other subgroup representative image within the group. Registration weighting values may then be determined for each prospective inter-subgroup image pair registration connection.

As previously mentioned, registration weighting values may relate to the expected accuracy, or usefulness, of registration between a pair of images, and may be determined from known actual spatial relationships between image pairs using, for example, a one-to-one relationship. In particular, registration weighting values may be determined by estimating such spatial relationships between image pairs using intra-image data (e.g. meta-data, and/or surrogate-data), without actually performing the registration calculations, or otherwise requiring inter-image data such as mutual-data to be derived. For example, registration weighting values may be determined based at least partly on the Identity relationship, e.g. whether the images are found or deemed to be in the same spatial frame. Additionally/alternatively, registration weighting values may be assigned on the basis of the differences between images using, for example, differential-data. In some examples, it is further contemplated that registration weighting values may be learnt from training data or the like.

Figure 9:
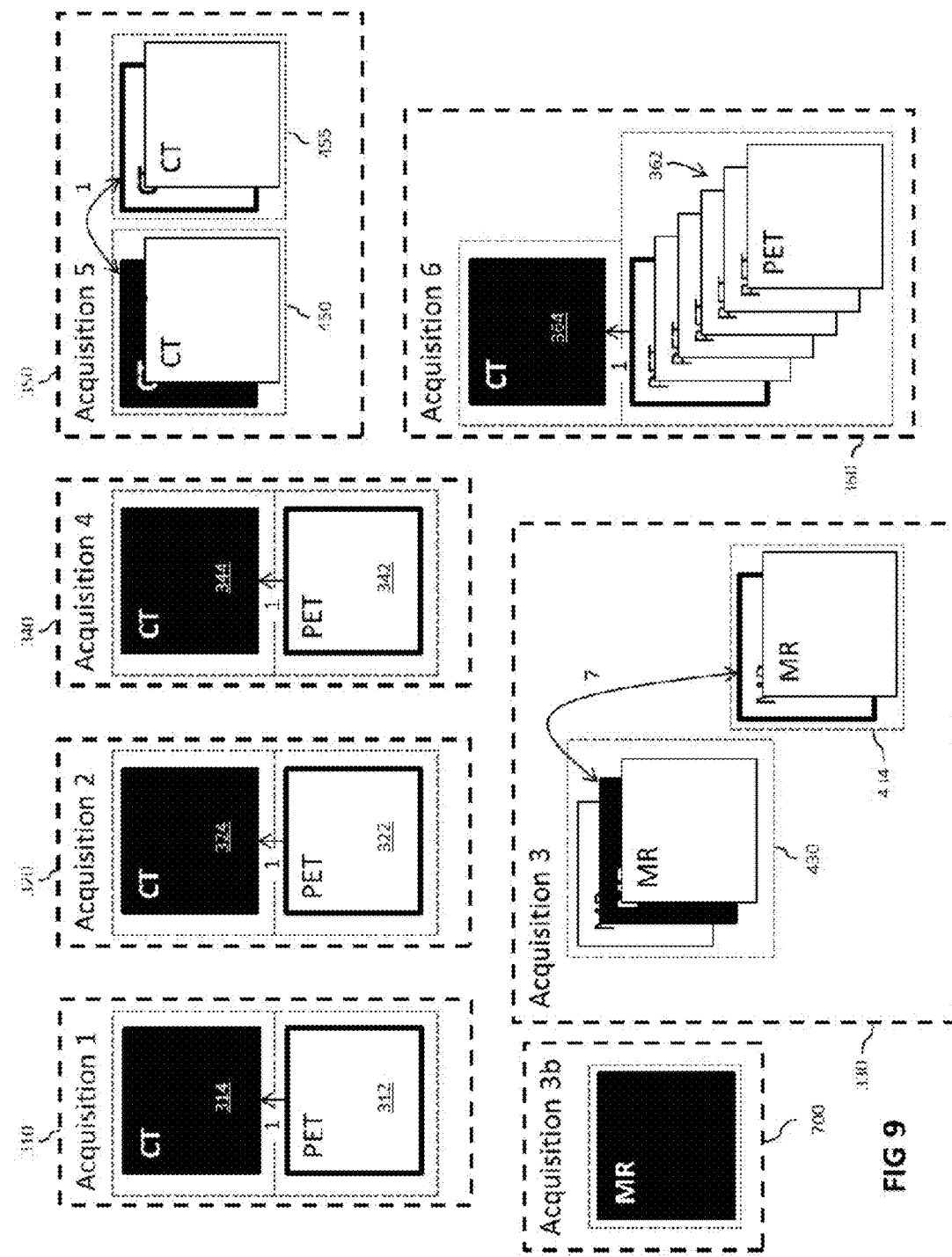

FIG. 9 illustrates a simplified example of the inter-subgroup registration weighting values for the series of images 300 of FIG. 3. In the illustrated example, a user has manually specified that the subgroups 450, 455 for acquisition group 5 should be separated; therefore a heuristic has been used to specify a deformable registration between the subgroup representative images for the subgroups 450, 455 for acquisition group 5. The registration weighting value (4 in the illustrated example) for such a deformable registration may be automatically assigned based on the difference in acquisition time. Furthermore for the illustrated example, the functional modalities (i.e. PET images) within acquisition groups 1 310, 2 320, 4 340 and 6 360) have been heuristically assigned to be registered to the corresponding anatomical images (i.e. CT images) using rigid relationships, and assigned a low registration weighting values (indicated by values of 1). With regard acquisition group 3 330, the MR images have been automatically assigned to be registered using a deformable relationship and assigned a registration weighting value of, in the illustrated example, 7 based on an estimation of the total deformation required for registration. It will be appreciated that each of the weighting values may be derived using intra-image data (e.g. meta-data, and/or surrogate-data), without the need to actually perform registration calculations, or otherwise calculate inter-image data such as mutual-data.

Prospective inter-group image pair registration connections may further be determined, and registration weighting values therefor determined. For example, prospective inter-group image pair registration connections may be defined between every pair of group representative images, such that each group representative image comprises a prospective inter-group image pair registration connection with every other group representative image. Registration weighting values may then be determined for each prospective inter-group image pair registration connection.

Figure 10:
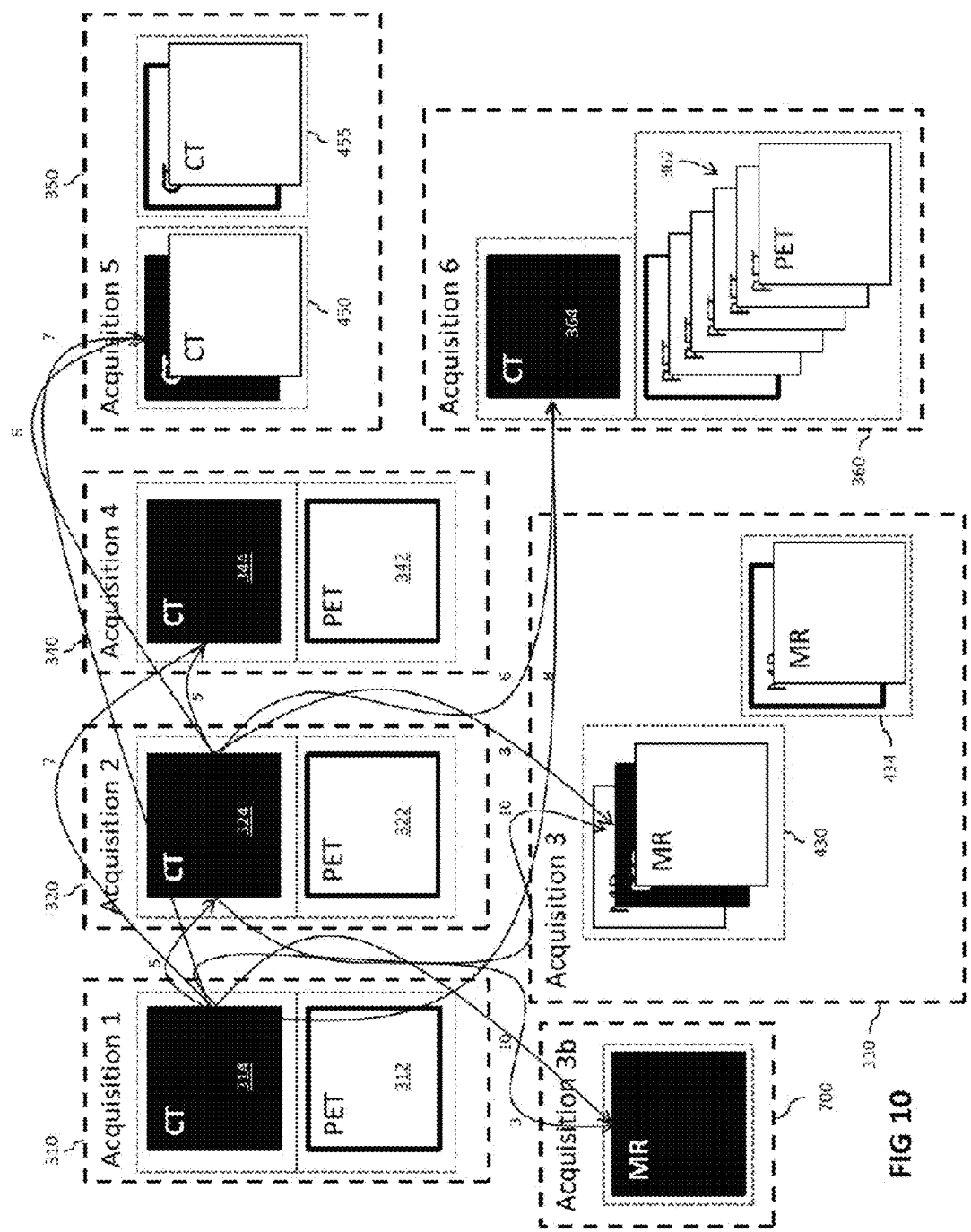

FIG. 10 illustrates a simplified example of the inter-group registration weighting values for the series of images 300 of FIG. 3. In the illustrated example, registration weighting values between MR images and CT images may have been assigned, assuming a deformable registration, based on the time difference between acquisitions, without calculating the actual registrations. Registration weighting values between CT images may have been assigned, assuming a deformable registration, based on the difference in field of view between the images, again without calculating the actual registration. For clarity, only the prospective inter-group image pair registration connections and their respective weighting values to the first two acquisition groups 310, 320 have been shown in FIG. 10.

Figure 11:
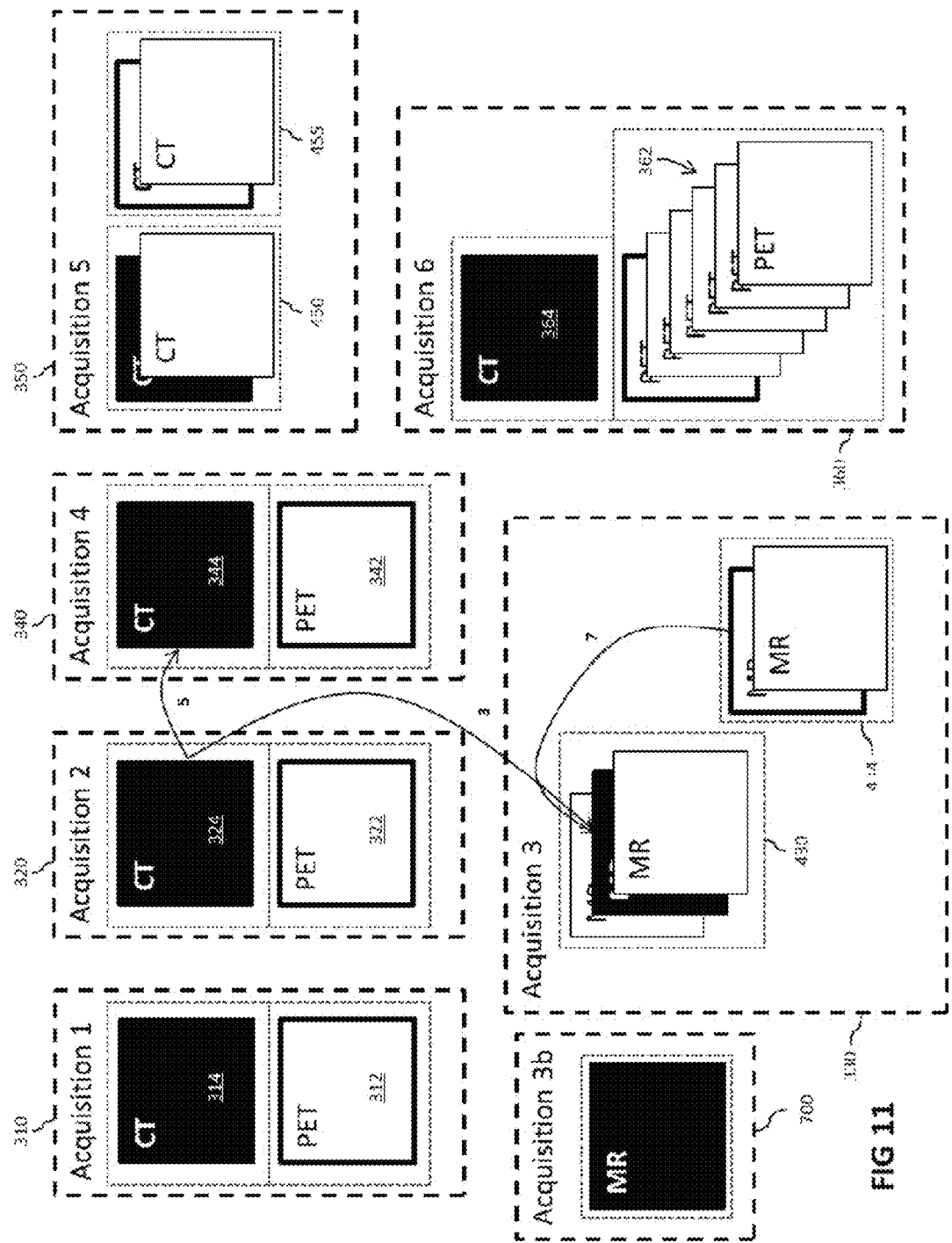

In accordance with some example embodiments of the present invention, the registration weighting values for the prospective image pair registration connections may be assigned to a weighted graph representing the prospective image pair registration connections. Optimal registration paths may then be determined for image pairs by solving the 'shortest path problem' using the weighted graph representing the prospective image pair registration connections. Determining an optimal registration path between a pair of images may be numerically trivial to solve where the prospective image pair registration connections have been assigned such that only one possible path exists between the images. More complex arrangements may be necessary to determine the optimal registration path between pairs of images, such as the Dijkstra's algorithm disclosed in "A note on two problems in connexion with graphs"; E. Dijkstra. Numerische Mathematick 1959;1:269-271. Algorithms for solving the 'shortest path problem' using weight graphs are well known in the art, and as such need not described in any greater detail herein. In some example embodiments of the present invention, it is further contemplated that it may be necessary/desirable to adjust weighting values along a path, for example to assign a higher value if an inverse transformation is required, or a lower value if the transformation has already been computed or is already known FIG. 11 illustrates an example of an optimal registration path between the CT image 344 of acquisition group 4 340 and the MR image providing the representative image in subgroup 434 of acquisition group 3 330. In the illustrated example, an additional cost of 1 is added for inverse registrations. The CT image 344 of acquisition group 4 340 comprises the representative image for acquisition group 4 340, whilst the MR image providing the representative image in subgroup 434 of acquisition group 3 330 comprises the representative image for subgroup 434 of acquisition group 3 330. Accordingly, in the illustrated example a registration path between these two images would comprise an inter-group path between the CT image 344 of acquisition group 4 340 and the representative image of acquisition group 3 330, which in the illustrated example comprises an MR image of subgroup 430. In the illustrated example, the shortest path (in terms of the registration weighting values) between the CT image 344 and the MR image of subgroup 430 is via the CT image 324 of acquisition group 2 320. Accordingly, the optimal (i.e. shortest) registration path between the CT image 344 of acquisition group 4 340 and the MR image providing the representative image in subgroup 434 of acquisition group 3 330 comprises a combined registration weighting of (5+1)+3+(7+1)=17. Alternative paths are available, but these would have greater registration weighting values (and thus registration complexity) associated with them.

Having determined the optimal registration paths for image pairs, registration transformations for image pair registration connections within the optimal registration paths may then be generated. For example, conventional one-to-one registration may be performed for each image pair registration connection. In some examples, where registration calculations for image pairs have previously been performed, and are known prior to processing, for example as part of a previous analysis of some of the image data, the registration transformations for those image pair registration connections may already be available. Image alignment data for each optimal registration path may then be generated by concatenating the registration transformations for individual image pair registration connections within the respective optimal registration path. For example, image alignment data for aligning the CT image 344 of acquisition group 4 340 to the MR image providing the representative image in subgroup 434 of acquisition group 3 330 may be generated by concatenating registration transformations for the image pair registration connections between: the CT image 344 of acquisition group 4 340 and the CT image 324 of acquisition group 2 320; the CT image 324 of acquisition group 2 320 and the MR image of subgroup 430 comprising representative image of acquisition group 3 330; and the MR image of subgroup 430 comprising representative image of acquisition group 3 330 and the MR image providing the representative image in subgroup 434 of acquisition group 3 330.

Figure 12:
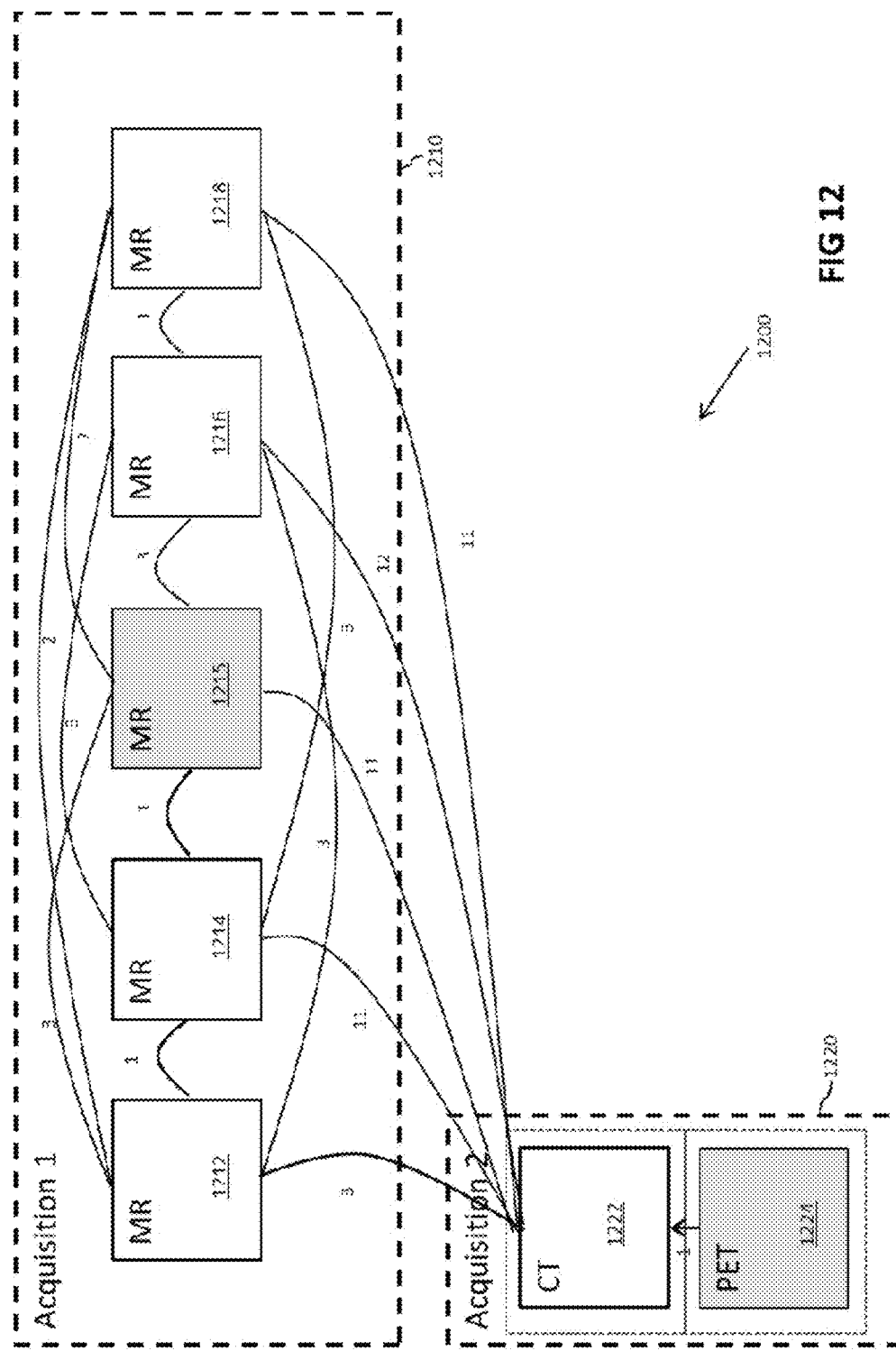
FIG. 12 illustrates part of an alternative example of a method of generating image alignment data.

FIG. 12 illustrates simplified example of a further series of images 1200. In the example illustrated in FIG. 12, two acquisitions have been made, of one of a sequence of MR images (acquisition 1 1210), and a second of a hybrid PET/CT scan (acquisition 2 1220). A CT image 1222 and a PET image 1224 of acquisition 2 1220 are treated as independent subgroups within the acquisition group 2 1220, where each image 1222, 1224 is the subgroup representative image.

A registration weighting value is assigned as 1 between these subgroups. The MR images 1212-1218 are all different sequences and are treated as independent groups, for example following a heuristic, where each image is the group representative image. The CT image 1222 is selected as the group representative image of acquisition group 2 1220. An inter-subgroup prospective image pair registration connection is defined between the CT image 1222 and the PET image 1224 of acquisition group 2 1220, and inter-group prospective image pair registration connections are defined between the CT image 1222 and the MR images 1212-1218, as illustrated in FIG. 12. All CT to MR prospective image pair registration connections are assigned registration weighting values for deformable registration based on training data regarding the MR scan sequence used. All MR to MR prospective image pair registration connections are assigned registration weighting values for deformable registration, based on difference in entropy between the images.

Assigning the registration weighting values to a weighted graph for the prospective image pair registration connections, the optimal (i.e. shortest) registration path between the PET image 1224 of acquisition group 2 1220 and MR image 1215 can be calculated as going via CT image 1222, MR image 1212 and MR image 124, with a combined registration weighting of 6 (1+3+1+1). Alternative paths are available, but these would have greater registration weighting values (and thus registration complexity) associated with them.

Accordingly, image alignment data for aligning the PET image 1224 of acquisition 2 1220 with the MR image 1215 of acquisition 1 1210 may be generated by concatenating registration transformations for the image pair registration connections between: the PET image 1224 and CT image 1222; CT image 1222 and MR image 1212; MR image 1212 and MR image 1214; and MR image 1214 and MR image 1215.

Figure 13:
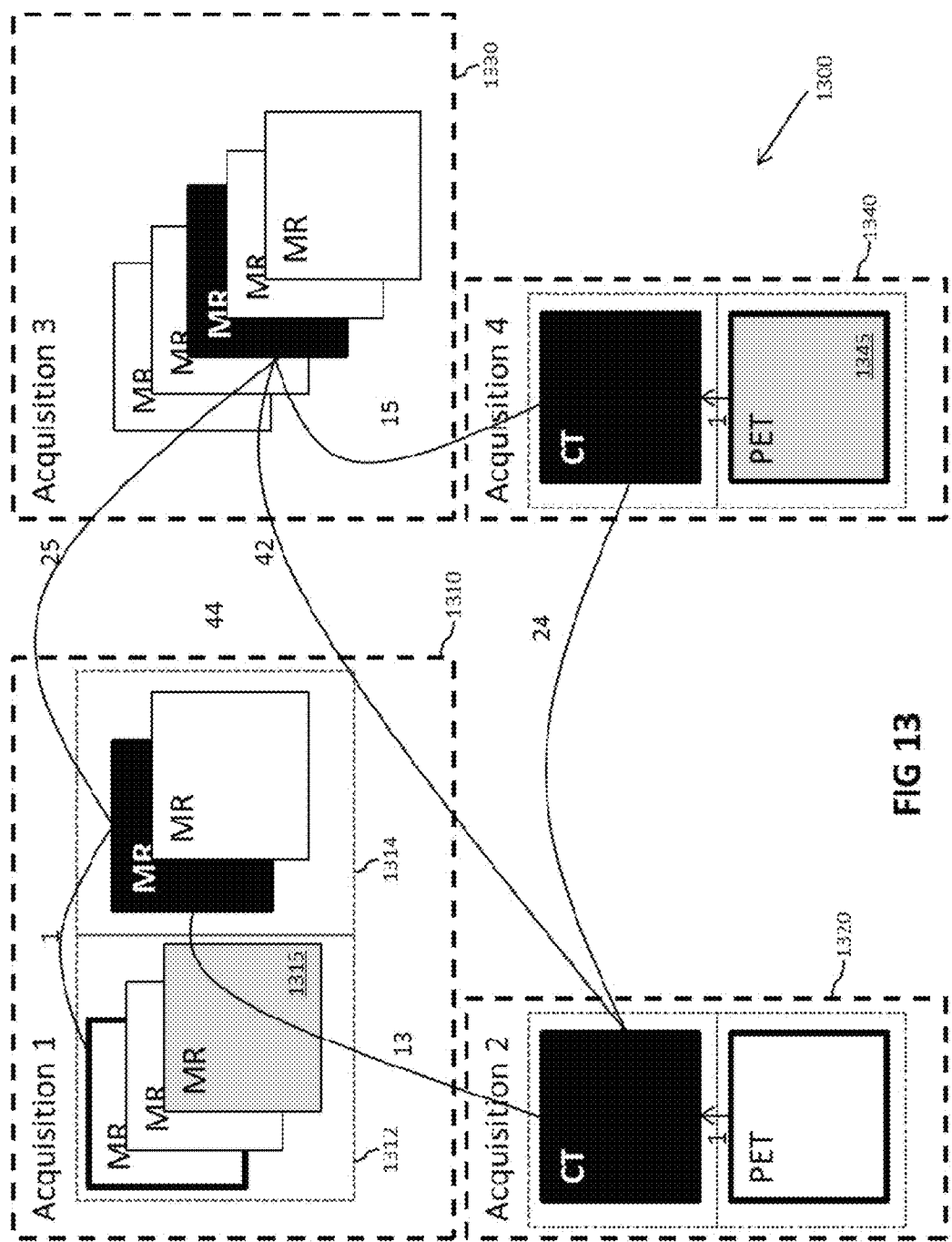
FIG. 13 illustrates part of a further alternative example of a method of generating image alignment data.

FIG. 13 illustrates simplified example of a still further series of images 1300. In the example illustrated in FIG. 13, four acquisitions have been made, two sequences of MR images (acquisition 1 1310 and acquisition 3 1330) and two PET/CT scans (acquisition 2 1320 and acquisition 4 1340). In the illustrated example, acquisitions 3 and 4 were taken about 6 months after acquisitions 1 and 2. The CT and PET images are treated as independent subgroups within their respective acquisition groups 1320 and 1340, where each image is the subgroup representative image. The MR images of acquisition 1 1310 have been split into two subgroups 1312, 1314 on the basis of field-of-view differences. In this example, intra-subgroup registrations are pre-configured to be Identity relationships, and as such intra-subgroup prospective image pair registration connections have been assigned no (i.e. zero) registration weighting values. The subgroup representative images have been selected from a pre-defined configuration based on the scan sequence used.

A registration weighting value has been assigned to inter-(sub)group prospective image pair registration connections on the basis of the area of overlap of the images, and the use of rigid registration for same frame-of-reference images. The MR image of acquisition 1 used as a group representative image was selected by user preference from the subset of subgroup representative images. The remaining group representative images were automatically selected as the highest mutual information with the user selected image. Registration weighting values were assigned on the basis of the difference of entropy content of the images, together with an additional registration weighting value based on the difference in acquisition date.

Assigning the registration weighting values to a weighted graph for the prospective image pair registration connections, the optimal (i.e. shortest) registration path between the PET image 1345 of acquisition 4 and the MR image 1315 of acquisition 1 can be calculated as going via the CT image of acquisition 2, with a combined registration weighting of 39 (1+24+13+1). Alternative paths are available, but these would have greater registration weighting values (and thus registration complexity) associated with them.

Accordingly, image alignment data for aligning the PET image 1345 of acquisition 4 1340 with the MR image 1315 in the first subgroup 1312 of of acquisition 1 1310 may be generated by concatenating registration transformations for the image pair registration connections between: the PET image 1345 and the CT image of acquisition 4 1340; the CT image of acquisition 4 1340 and the CT image of acquisition 2 1320; the CT image of acquisition 2 1320 and the group representative MR image for acquisition 1 (in the second subgroup 1314); the group representative MR image for acquisition 1 (in the second subgroup 1314) and the subgroup representative MR image for subgroup 1312; and the subgroup representative MR image for subgroup 1312 and MR image 1315.

Advantageously, by generating a weighted graph to identify optimal registration paths as described above, reliable image alignment data is able to be generated whilst reducing the total number of registration performed (compared with registering every image with every other image as in a conventional one-to-one registration approach). Furthermore, by grouping images based on existing relationships within (sub)groups of images, and using representative images from those (sub)groups for intergroup registration, the complexity of the weighted graph may be significantly reduced, thereby reducing the computational complexity of generating the image alignment data.

Figure 14:
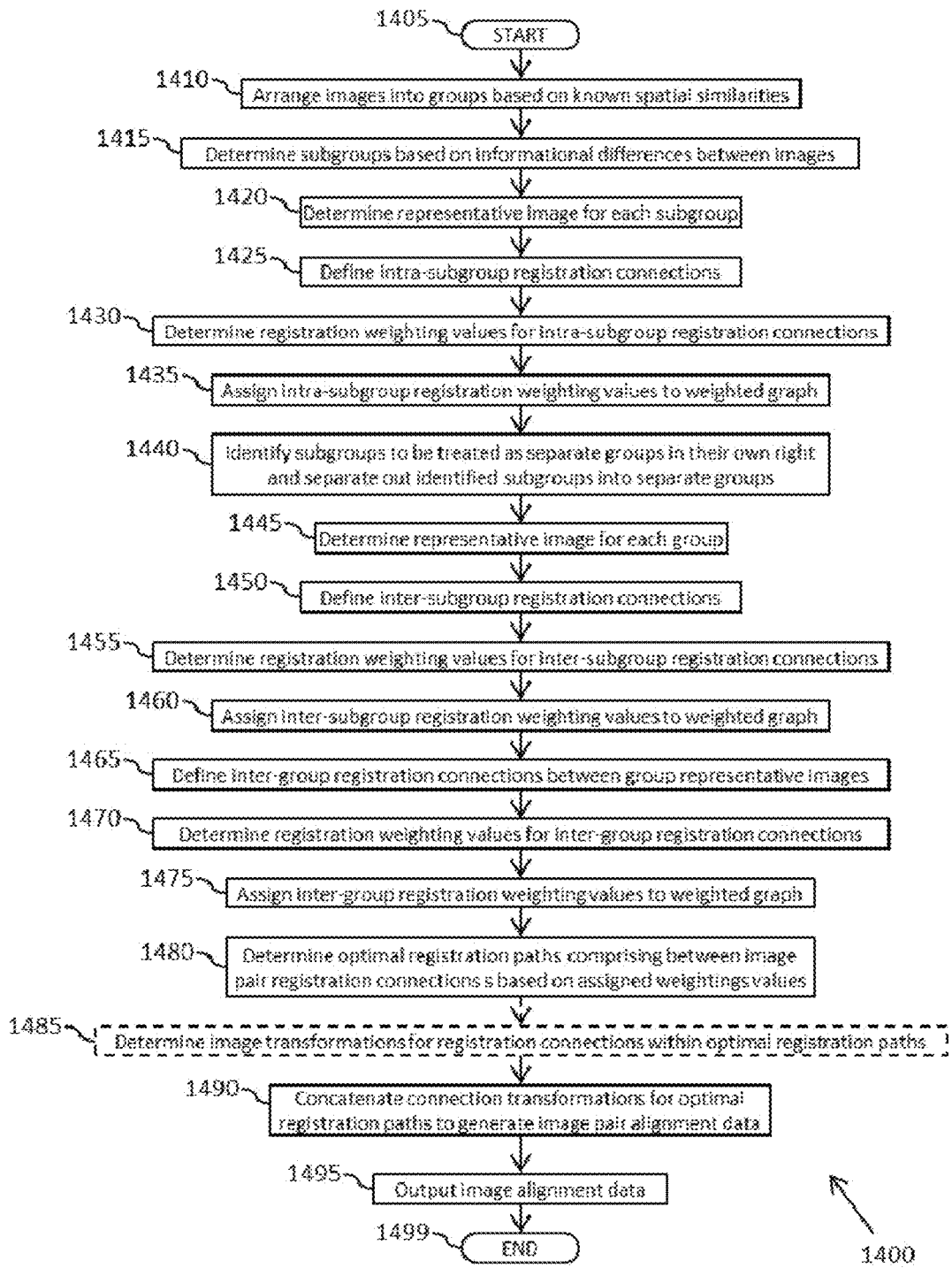
FIG. 14 illustrates a simplified flowchart of an example of a method of generating image alignment data.

Referring now to FIG. 14, there is illustrated a simplified flowchart 1400 of a method of generating image alignment data for medical images, such as may be performed by the image registration component(s) 140 of FIG. 1. The method starts at 1405, and moves on to 1410 where a series of images for which image alignment data is to be generated are arranged into groups, for example based on known spatial similarities as illustrated in FIG. 3. Next, at 1415, subgroups are determined based on, for example, informational differences between images, such as illustrated in FIG.

4. Representative images are then determined for each subgroup at 1420, for example as illustrated in FIG. 5. Next, at 1425, prospective intra-subgroup image pair registration connections are defined, and registration weighting values are determined for the defined prospective intra-subgroup image pair registration connections at 1430, such as illustrated in FIG. 6. The intra-subgroup registration weighting values are assigned to a weighted graph, at 1435. Next, at 1440, subgroups to be treated as separate groups in their own right are identified and separated out into separate groups, for example as illustrated in FIG. 7 for the MR image 432 of acquisition group 3. The method then moves on to step 1445 where representative images are for each group are determined, such as illustrated in FIG. 8. Next, at 1450, prospective inter-subgroup image pair registration connections are defined, and registration weighting values are determined for the defined prospective inter-subgroup image pair registration connections at 1455, such as illustrated in FIG. 9. The inter-subgroup registration weighting values are assigned to a weighted graph, at 1460. The method then moves on to step 1465 where prospective inter-group image pair registration connections are defined, and registration weighting values are determined for the defined prospective inter-group image pair registration connections at 1470, such as illustrated in FIG. 10. The inter-subgroup registration weighting values are assigned to a weighted graph, at 1475. Next, at 1480, optimal registration paths are determined comprising image pair registration connections based on the weighted registration values assigned to the weighted graph. Having determined the optimal registration paths for image pairs, registration transformations for image pair registration connections within the optimal registration paths may then be generated at 1485. In some examples, where registration calculations for image pairs have previously been performed, for example as part of determining a registration weighting value for a particular prospective image pair registration connections, the registration transformations for those image pair registration connections may already be available. Accordingly, step 1485 may (at least partially) be omitted for those image pair registration connections for which registration transformation are already available. Image alignment data for each optimal registration path may then be generated by concatenating the registration transformations for individual image pair registration connections within the respective optimal registration path, at 1490. The image alignment data is then output, at 1495, for example to the image display component(s) 150 of FIG. 1 for display of the images, or simply to, for example, the database 120 for storage and subsequent use. The method then ends, at 1499.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A method of generating image alignment data for medical images, the method comprising:
   determining prospective image pair registration connections;
   determining registration weighting values for the determined prospective image pair registration connections based on intra-image attribute data, the determining registration weighting values being performed without performing image registration between the prospective image pair;
   determining optimal registration paths for image pairs based at least partly on the registration weighting values for the prospective image pair registration connections; and
   generating image alignment data for the determined optimal registration paths, without requiring inter-image data;
   wherein the intra-image attribute data comprises meta-data;
   wherein determining prospective image pair registration connections comprises:
     arranging images into groups;
     determining at least one group representative image for each group of images; and
     defining prospective inter-group image pair registration connections via the determined group representative images.

2. The method of claim 1, wherein the method comprises arranging images into groups based at least partly on at least one known spatially related parameter.

3. The method of claim 2, wherein the method comprises arranging images into groups based at least partly on at least one of:
   image acquisitions; and
   frames of reference.

4. The method of claim 1, wherein the method further comprises:
   arranging images within at least one group into subgroups;
   determining at least one subgroup representative image for each subgroup of images; and
   defining prospective inter-subgroup image pair registration connections via the determined subgroup representative images.

5. The method of claim 4, wherein the method comprises arranging images within the at least one group into subgroups based at least partly on at least one of:
   a heuristic;
   assessing one or more pieces of meta-data, surrogate-data and/or differential-data using statistical or logical techniques; and
   assessing mutual-data for significant differences between the images.

6. The method of claim 4, wherein the method comprises defining prospective intra-subgroup image pair registration connections between every pair of images within a respective subgroup such that each image within a subgroup comprises a prospective intra-subgroup image pair registration connection with every other image within that subgroup.

7. The method of claim 4, wherein the method comprises determining a group representative image for at least one group of images from the representative images for the subgroups of images within that group.

8. The method of claim 4, wherein the method comprises identifying subgroups to be treated as separate groups in their own right, and separating out the identified subgroups into separate groups.

9. The method of claim 8, wherein the method comprises identifying subgroups to be treated as separate groups in their own right based at least partly on at least one of:
   a heuristic;
   assessing one or more pieces of meta-data, surrogate-data and/or differential-data using statistical or logical techniques;
   assessing mutual-data for significant differences between the images;
   estimating a required registration between subgroup representative images within a group; and
   estimating a required registration between subgroup representative images and a representative image of the respective group.

10. The method of claim 1, wherein the method comprises determining representative images based at least partly on image characteristics comprising at least one of:
    meta-data;
    surrogate-data;
    differential-data; and
    a heuristic.

11. The method of claim 1, wherein the method comprises determining registration weighting values for the prospective image pair registration connections based at least partly on at least one of:
    known actual spatial relationships between image pairs;
    estimated spatial relationships between image pairs;
    identity relationships between image pairs;
    values learnt from training data.

12. The method of claim 1, wherein the method comprises:
    assigning the determined registration weighting values for the prospective image pair registration connections to a weighted graph representing the prospective image pair registration connections; and
    determining optimal registration paths for image pairs based at least partly on the weighted graph representing the prospective image pair registration connections.

13. The method of claim 1, wherein the method comprises generating registration transformations for image pair registration connections within the determined optimal registration paths.

14. The method of claim 13, wherein the method comprises generating image alignment data for a determined optimal registration path by concatenating registration transformations for image pair registration connections within that determined optimal registration path.

15. The method of claim 1, where the method further comprises providing the generated image alignment data to a signal processing module arranged to execute computer program code, the signal processing module being arranged to enable the alignment of images for display.

16. A method of displaying a plurality of medical images as in claim 1, the method further comprising:
   aligning at least the set of medical images to be displayed based at least partly on the image alignment data therefor; and
   displaying the aligned set of medical images.

17. A medical imaging system comprising a signal processing module for generating image alignment data for medical images; the signal processing module arranged to execute computer program code, the signal processing module being arranged to:
   determine prospective image pair registration connections;
   determine registration weighting values for the determined prospective image pair registration connections based on intra-image attribute data, the determining registration weighting values being performed without performing image registration between the prospective image pair;
   determine optimal registration paths for image pairs based at least partly on the registration weighting values for the prospective image pair registration connections; and
   generate image alignment data for the determined optimal registration paths, without requiring inter-image data;
   wherein the intra-image attribute data comprises metadata;
   wherein determining prospective image pair registration connections comprises:
      arranging images into groups;
      determining at least one group representative image for each group of images; and
      defining prospective inter-group image pair registration connections via the determined group representative images.

18. A method of generating image alignment data for medical images, the method comprising:
   determining prospective image pair registration connections;
   determining registration weighting values for the determined prospective image pair registration connections based on intra-image attribute data, the determining registration weighting values being performed without performing image registration between the prospective image pair;
   determining optimal registration paths for image pairs based at least partly on the registration weighting values for the prospective image pair registration connections; and
   generating image alignment data for the determined optimal registration paths, without requiring inter-image data,
   wherein the intra-image attribute data comprises differential-data;
   wherein determining prospective image pair registration connections comprises:
      arranging images into groups;
      determining at least one group representative image for each group of images; and
      defining prospective inter-group image pair registration connections via the determined group representative images.

19. A method of generating image alignment data for medical images, the method comprising:
   determining prospective image pair registration connections;
   determining registration weighting values for the determined prospective image pair registration connections based on intra-image attribute data, the determining registration weighting values being performed without performing image registration between the prospective image pair;
   determining optimal registration paths for image pairs based at least partly on the registration weighting values for the prospective image pair registration connections; and
   generating image alignment data for the determined optimal registration paths, without requiring inter-image data;
   wherein the intra-image attribute data comprises surrogate data, the surrogate data comprising contrast/dynamic range data, or information content;
   wherein determining prospective image pair registration connections comprises:
      arranging images into groups;
      determining at least one group representative image for each group of images; and
      defining prospective inter-group image pair registration connections via the determined group representative images.

20. A medical imaging system comprising a signal processing module for generating image alignment data for medical images; the signal processing module arranged to execute computer program code, the signal processing module being arranged to:
   determine prospective image pair registration connections;
   determine registration weighting values for the determined prospective image pair registration connections based on intra-image attribute data, the determining registration weighting values being performed without performing image registration between the prospective image pair;
   determine optimal registration paths for image pairs based at least partly on the registration weighting values for the prospective image pair registration connections; and
   generate image alignment data for the determined optimal registration paths, without requiring inter-image data;
   wherein the intra-image attribute data comprises differential-data;
   wherein determining prospective image pair registration connections comprises:
      arranging images into groups;
      determining at least one group representative image for each group of images; and
      defining prospective inter-group image pair registration connections via the determined group representative images.

21. A medical imaging system comprising a signal processing module for generating image alignment data for medical images; the signal processing module arranged to execute computer program code, the signal processing module being arranged to:
- determine prospective image pair registration connections;
- determine registration weighting values for the determined prospective image pair registration connections based at least partly on intra-image attribute data, the determining registration weighting values being performed without performing image registration between the prospective image pair;
- determine optimal registration paths for image pairs based at least partly on the registration weighting values for the prospective image pair registration connections; and
- generate image alignment data for the determined optimal registration paths, without requiring inter-image data;
- wherein the intra-image attribute data comprises surrogate data, the surrogate data comprising contrast / dynamic range data, or information content;
- wherein determining prospective image pair registration connections comprises:
  - arranging images into groups;
  - determining at least one group representative image for each group of images; and
  - defining prospective inter-group image pair registration connections via the determined group representative images.

* * * * *